April 10, 1962   L. P. ENGLISH ET AL   3,029,375
STUD WELDING APPARATUS
Filed Feb. 3, 1960
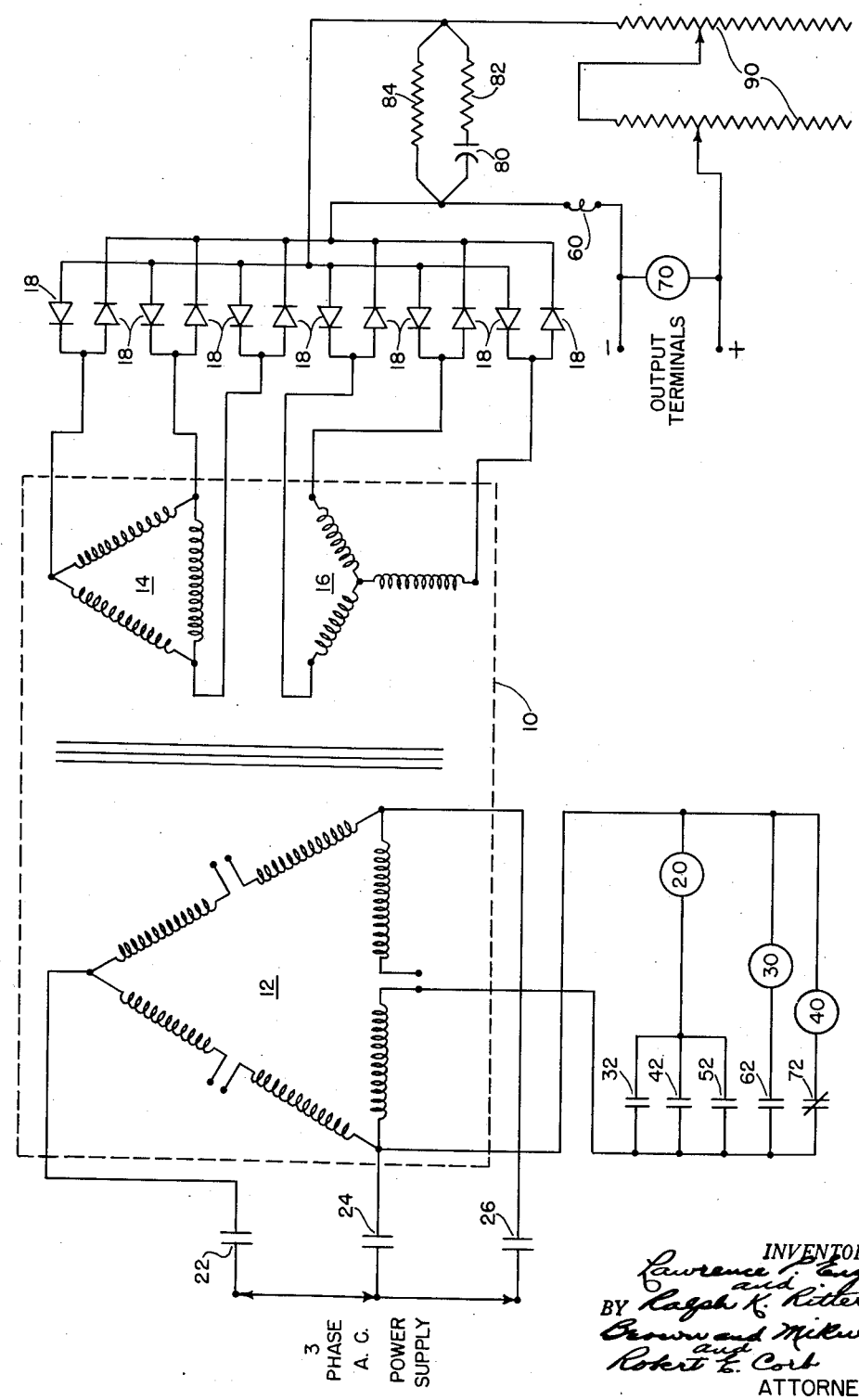
INVENTORS
Lawrence P. English
and
BY Ralph K. Ritter
Brown and Mikulka
and
Robert E. Cork
ATTORNEYS

United States Patent Office 3,029,375
Patented Apr. 10, 1962

3,029,375
STUD WELDING APPARATUS
Lawrence P. English, Haddon Heights, and Ralph K. Ritter, Haddonfield, N.J., assignors to KSM Products, Inc., Merchantville, N.J., a corporation of New Jersey
Filed Feb. 3, 1960, Ser. No. 6,454
21 Claims. (Cl. 321—11)

This invention relates to apparatus for supplying direct current suitable for electric arc welding, and particularly to apparatus in the form of a power pack for supplying current for the welding of studs and the like.

In the welding of studs, wires and the like, direct current of high value is passed through the stud or wire and the workpiece to which it is to be welded for melting adjoining portions of the end of the stud and the workpiece. As a rule, melting is accomplished by creating an arc between the stud and workpiece and maintaining the arc for a relatively brief period, usually less than one or two seconds. The present invention has as an object the provision of a novel and improved power supply apparatus including current rectification means designed to operate under a load which substantially exceeds the rated continuous duty capacity of the rectification means for supplying direct current for stud welding operations, said apparatus being characterized by its simplicity and inexpensiveness of construction and its dependable operation.

Because stud welding processes require power intermittently and for short periods of time, it is possible to achieve the inexpensive construction noted above by intentionally designing the apparatus to operate for predetermined brief periods at loads which exceed the continuous duty capacity of the rectifier comprising the apparatus. However, should this predetermined overload be exceeded for more than a maximum permissible period, it would be very likely to result in damage to the rectifier, causing it to fail. Accordingly, the invention has as another object the provision, in a stud welding current supply apparatus of the type described, of protective means for allowing the apparatus to operate for only a preset time period under a predetermined overload and for rendering the apparatus inoperative when this period is exceeded and thereby preventing damage to the apparatus.

Another protective device which it is advisable to incorporate in a welding current power pack includes means for protecting the power pack against short-circuit loading. However, in many stud welding operations, depending on the particular welding apparatus employed, a short-circuit condition is created briefly at some time during the welding cycle. The duration of the short-circuit condition, fortunately, is usually sufficiently brief to be within the maximum period of short-circuit load that can be tolerated by the rectifier comprising the power pack without resulting in damage to the rectifier. It is a further object of the invention to provide a stud welding power pack substantially as described including means for protecting the power pack against damaging short-circuit operation, while allowing intermittent short-circuit operation as required by many welding processes for predetermined brief periods, the duration of which is so limited as to preclude damage to the rectifiers.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which is a schematic diagram of the electrical components of a direct current power supply apparatus embodying the invention.

The basic desirable requirements of a stud welding power pack are: that it be simple, comprising as few as possible, easily assembled components; that the components thereof be inexpensive; that the power pack be as small and as light as possible, specifically that it be manually portable; that it be versatile, being useful with any type of stud welding apparatus regardless of the particular welding cycle performed by that apparatus; that it be protected against electrical failure due to damage resulting from accident and/or misuse; that it be operable from conventional alternating current power sources; and that its operation be uniform, dependable and readily subject to accurate control. The basic components of a stud welding power pack include a rectifier for converting alternating current to direct current, a transformer for both isolating the direct current output from the alternating current source and for supplying alternating current at the appropriate voltage to the rectifier, means for controlling the output of the rectifier and means for protecting the apparatus, particularly the rectifier, against damage due to overloads.

Many of these desirable requirements for a stud welding power pack, particularly simplicity, ease of assembly, inexpensiveness and portability, are achieved by the single expedient of providing current rectification means which are required to operate under an overload in order to supply the current required for stud welding. This construction then necessitates the incorporation of special protective devices for preventing damage to the rectification means due to overloads of greater magnitude and of longer duration than such means can tolerate, while at the same time allowing the apparatus to be operated under overloads of predetermined magnitude and duration and within the limits of the rectifier means. Since the power pack is intended for use with a variety of different stud welding apparatus performing different welding cycles and imposing a number of different load conditions on a pack, the pack, and particularly the protective devices, must be designed so as to be readily adapted to a particular set of operating conditions and to function in a dependable and predictable manner under such conditions.

Reference is now made to the drawing wherein there is illustrated a stud welding current supply apparatus embodying the invention and meeting the requirements discussed above, the apparatus being illustrated with the elements thereof in their normal conditions, that is, as they would appear when the apparatus is not operating. The apparatus comprises a three-phase alternating current transformer 10 having a primary winding 12 and two secondary windings 14 and 16. Primary winding 12 is delta-connected, and the branches thereof are split to permit their connections to be varied to allow the transformer to be powered by current of different voltages, for example by either 220 or 440 volt conventional, three-phase alternating current sources.

Means are provided for turning the welding current supply apparatus on and off and, in the form shown, comprise a shunt trip relay coil 20 including contacts 22, 24 and 26 connected between the power input terminals of the apparatus and the primary of transformer 10. Contacts 22, 24 and 26 may be opened and closed manually and thus provide an on-off switch for the apparatus. The construction and operation of coil 20 and contacts 22, 24 and 26 are such that the contacts remain closed as long as coil 20 is not energized, and the flow of current to coil 20 is effective to open the contacts substantially instantaneously. Accordingly, the protective devices of the apparatus, which prevent it from being damaged due to accidental overload or by misuse, are tied in with coil 20 so as to turn off the apparatus before it can suffer damage. Power for coil 20 is provided by connecting the coil across a portion of one of the branches of primary 12 in series with three parallel, normally open contact points 32, 42 and 52 so that closing of any one of the points will result in the flow of current to the coil and the immediate opening of contacts 22, 24 and 26.

The direct current required for welding is obtained by rectification of the alternating current output of transformer 10. In the present apparatus, rectification of three-phase alternating current is accomplished by two bridge circuits each comprising six semi-conductor type rectifiers or diodes. As was noted above, rectifiers of this type can be subjected, for a relatively short period, to a load which exceeds the load at which they can be safely operated continuously and for prolonged periods; and since stud welding is an intermittent operation requiring current of high value for only short periods, the rectifiers may be safely operated in excess of their rated continuous or 100% duty cycle load capacities for the necessary periods, allowing a considerable savings in cost to be effected by reducing the number of rectifiers employed and by using rectifiers having the lowest possible 100% duty load capacity substantially below that of the welding current drawn therefrom. The lowest possible cost is realized by achieving a balance between the number of rectifier elements on the one hand and the load capacity of the rectifier elements on the other. It has been found that for most practical purposes, this balance of the two factors is obtained by employing two six-element bridge rectifiers.

The internal resistances of the rectifier elements or diodes, herein designated 18, vary slightly with the result that when bridge rectifiers are connected in parallel, one of the rectifiers has the tendency to pass a disproportionate share of the load current. As this continues, the overload on the rectifier increases to the extent that the diodes are damaged and ultimately fail. The problem of balancing the load between parallel rectifiers is avoided entirely in the apparatus of the invention by providing two rectifier circuits which are operative entirely independently of one another. This is achieved by providing two secondaries 14 and 16 in transformer 10 and connecting each of the two bridge rectifiers to a separate transformer secondary. The output terminals of the two rectifiers are then joined to provide the direct current power output of the apparatus. As a means for evening out the output of the two rectifiers, transformer secondary 14 is delta-connected and transformer secondary 16 is Y-connected. This results in putting the two rectifier circuits out of phase so that they do not reach a peak simultaneously.

Another feature of the welding current supply apparatus is means in the direct current circuit for suppressing transients and preventing oscillation, either of which might damage the diodes and/or result in poor welds. This transient suppressing means comprises a capacitor 80 connected across the rectifier output for absorbing transient voltages and a relatively low resistance 82 connected in series with the capacitor for damping any oscillation in the circuit. A very high resistance 84 is provided in parallel with capacitor 80 and resistance 82 for dissipating the charge on the capacitor when the apparatus is turned off and the bias on the capacitor is terminated.

In order to provide for variation in the welding current output of the apparatus, there are provided variable cascade or stepped resistors 90, series-connected to provide for a wide range of currents subject to precise and finely variable control.

As previously noted, the welding current supply apparatus includes three protective devices, each of which comprises and/or controls the operation of one of contact points 32, 42 and 52 for turning off the apparatus before damage thereto can occur. Perhaps the simplest of these devices is intended to prevent damage to the transformer due to overheating, and for this purpose points 52 comprise a temperature-sensitive switch physically disposed within the transformer.

The welding current power supply apparatus of the invention is designed to be employed with substantially any type of arc stud welding apparatus. Certain types of stud welders operate in such a way as to create a momentary short circuit across the output of the welding current power supply, either at the start, during, or at the end of the welding cycle. This short circuit condition can be tolerated without damage to the rectifiers for short periods, for example up to ten cycles, but if allowed to persist for longer periods, would result in damage to the rectifiers. Accordingly, one of the protective devices comprises means for stopping the operation of the power pack if the output terminals are short circuited and this condition continues longer than for a predetermined allowable period. This last-mentioned protective device comprises a coil 60 connected in series with the rectifier output. Coil 60 controls the operation of normally open contacts 62 provided for controlling the operation of a time delay coil 30, the latter being powered from the same source as coil 20. Time delay coil 30, in turn, controls normally open contact points 32. Coil 60 is so constructed that a current flow through the coil, such as would result from a short circuit, is effective to close contacts 62, thereby energizing time delay coil 30. Time delay coil 30 is preferably adjustable and is preset to close contact points 32 after a predetermined delay which is less than the maximum time allowable for short-circuit load on the rectifiers, for example between five and ten cycles. If the short circuit condition continues for longer than this delay period, time delay coil 30 closes contact points 32, energizing coil 20 and opening contacts 22, 24 and 26. If the short-circuit condition is terminated before time delay coil 30 times out, contacts 62 open, interrupting the flow of current to the time delay coil.

The rectifiers are intended to be operated at a predetermined overload which is less than the short circuit load and for periods which are substantially longer than the maximum allowable short-circuit load period and which, for example, may exceed two seconds. A second protective device is provided for limiting the period during which current can be drawn from the power supply apparatus, and in effect, this device also limits the apparatus to use for stud welding and prevents its use for conventional arc welding requiring current for several seconds or even minutes. This last-mentioned protective device comprises a time delay coil 40, which is preferably adjustable, for controlling the operation of contact points 42. Time delay coil 40 is powered from the same source as coils 20 and 30 and is connected in series with normally closed contact points 72. It will be appreciated that, with this arrangement, time delay coil 40 will be energized as soon as contacts 22, 24 and 26 are closed, rendering the welding supply apparatus operative, and that, if other provision were not made, time delay coil 40 would time out, closing contact points 42 to energize coil 20 and open contacts 22, 24 and 26 and rendering the welding current supply apparatus inoperative. Accordingly, means are provided for opening contact points 72 immediately as the apparatus commences to operate and for closing contact points 72 during the period of an overload on the rectifiers. This last-mentioned means comprises a coil 70 connected across the output terminals of the rectifier circuit. Coil 70 is thus energized to open contact points 72 when the welding current supply apparatus is turned on and the full voltage output of the rectifiers is available. This arrangement is such that the potential difference developed across coil 70 drops whenever current is drawn from the rectifiers. Coil 70 is so constructed that when this potential difference drops to a value consistent with a predetermined load on the rectifiers, the coil allows contact points 72 to close, energizing time delay coil 40. If this current drain on the rectifiers continues past the predetermined time limit of coil 40, and this period may exceed two seconds for example, the time delay coil times out, closing contact points 42, energizing coil 20 and opening contacts 22, 24 and 26 to render the apparatus inoperative.

Experience has shown that for most manual stud welding operations it is safe to assume that the welding current supply apparatus, particularly the rectifiers, will be operated on a 10% duty cycle. This makes it possible to construct a welding current supply apparatus in accordance with the invention and comprising, for example, two bridge rectifiers each having a rated capacity for a 100% duty cycle of 315 amperes but designed to deliver 750 amperes current on a 10% duty cycle. The apparatus suggested by way of example and comprising two such rectifiers would be capable of delivering current up to 1500 amperes for stud welding and to operate under load at output terminal voltages ranging from 35 to 110 volts direct current. It would be possible with this apparatus, for example, to weld one stud every seven and one-half seconds wherein the current required for welding is 1500 amperes during a welding time of forty-five cycles (three-quarters of a second). The maximum time period during which the rectifiers can be operated under an overload and without damage is a function of the magnitude of the overload so that the apparatus could be employed, for example, to deliver current at 500 amperes for periods in excess of two seconds over a longer duty cycle.

The apparatus of the invention is intended only as a source of direct current suitable for stud welding and is adapted to be coupled with another apparatus, including such means as a stud welding gun and a control device for operating the welding gun and power pack, to achieve a predetermined welding cycle. The power pack with its protective devices is operative independently of the control device, and the output of the power pack is fed into the control device which, in turn, controls the flow of welding current to the gun at the proper time and for the proper duration. The power pack is versatile in that it is capable of operating dependably and uniformly with almost any stud welding control device and gun under a variety of conditions, yet is protected against damage and failure due to overloads or misuse resulting from the operation of any of the power pack, stud welding gun, and/or welding cycle control apparatus.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Apparatus for supplying direct current for intermittent welding operations of short duration and requiring current of high value, said apparatus being operative from an alternating current power source and comprising, in combination, a rectifier; a transformer connected to said alternating current power source for supplying power to said rectifier; switch means for interrupting the flow of current from said power source to said transformer; first control means responsive to a potential difference across the output of said rectifier for allowing said rectifier to be operated under a predetermined load during a first predetermined period and for opening said switch means before said predetermined period is exceeded; and second control means responsive to current from said rectifier for opening said switch means when current exceeding a predetermined value is drawn from said rectifier for a second predetermined period of time.

2. The welding current supply apparatus of claim 1 wherein said predetermined load on said rectifier permitted by said first control means exceeds, by a predetermined amount, the 100% duty cycle load capacity of said rectifier, and said second predetermined period during which current of said predetermined value is allowed to be drawn is of a duration insufficient to result in damage to said rectifier.

3. The welding current supply apparatus of claim 2 wherein said second control means is responsive to the flow of current consistent with a short circuit across the output of said rectifier for opening said switch means.

4. The welding current supply apparatus of claim 1 wherein said first control means comprises relay means for opening said switch means when said relay means is energized, a second normally closed switch for allowing current to flow to said relay means to energize the latter, and means responsive to a predetermined potential difference across the output of said rectifier for holding said second switch means open and for allowing said second switch to close when the potential difference across said rectifier output falls to a value consistent with said predetermined load on said rectifier.

5. Apparatus for supplying direct current for intermittent welding operations of short duration and requiring current of high value, said apparatus being operative from an alternating current power source and comprising, in combination, a rectifier; a transformer connected to said alternating current power source for supplying power to said rectifier; switch means for interrupting the flow of current from said power source to said transformer; first control means connected across the output terminals of said rectifier and responsive to a predetermined drop in the potential difference across the rectifier output consistent with a predetermined load on said rectifier for opening said switch means at the end of a first predetermined period; and second control means connected in series with the output of said rectifier and responsive to the flow of current of predetermined value for opening said switch means when current of said predetermined value is drawn from said rectifier for a predetermined period of time.

6. The welding current supply apparatus of claim 5 wherein said predetermined load on said rectifier permitted by said first control means exceeds, by a predetermined amount, the 100% duty cycle load capacity of said rectifier, and the last-mentioned predetermined period during which current of said predetermined value is allowed to be drawn is of a duration insufficient to result in damage to said rectifier.

7. The welding current supply apparatus of claim 6 wherein said second control means is responsive to the flow of current consistent with a short circuit across the output of said rectifier for opening said switch means.

8. The welding current supply apparatus of claim 5 wherein said first control means comprises relay means for opening said switch means when said relay means is energized, a second normally closed switch allowing current to flow to said relay means for energizing the latter, and means responsive to a predetermined potential difference across the output of said rectifier for holding said second switch open and for allowing said second switch to close when the potential difference across the output of said rectifier falls to a value consistent with said predetermined load on said rectifier.

9. Apparatus for supplying direct current for intermittent welding operations of short duration and requiring current of high value, said apparatus being operative from an alternating current power source and comprising, in combination, a rectifier of the bridge type comprising semi-conductor elements capable of overload operation for brief periods without suffering damage and operation under short-circuit conditions for shorter periods without suffering damage; a transformer connected to said alternating current power source for supplying power to said rectifier; switch means for interrupting the flow of current from said power source to said transformer; first control means responsive to a predetermined potential difference across the output of said rectifier for opening said switch means when current exceeding, by a predetermined amount, the 100% duty cycle current capacity of said rectifier is drawn therefrom for a predetermined period of time; and second control means responsive to current from said rectifier for allowing said rectifier to be operated under short-circuit load conditions during a predetermined period which is shorter than the first-mentioned period and is of insufficient duration to result in damage to the rectifier and for opening said switch means before the last-mentioned predetermined period is exceeded.

10. Apparatus for supplying direct current for intermittent welding operations of short duration and requiring current of high value, said apparatus being operative from an alternating current power source and comprising, in combination, a rectifier of the bridge type including semi-conductor elements capable of overload operation for brief periods without suffering damage and operation under short-circuit conditions for shorter periods without suffering damage; a transformer connected to said alternating current power source for supplying power to said rectifier; switch means for interrupting the flow of current from said power source to said transformer; first control means connected across the output of said rectifier and being responsive to a predetermined drop in the potential difference across the output of said rectifier consistent with any load on said rectifier exceeding by a predetermined amount the 100% duty cycle current capacity of said rectifier for opening said switch means at the end of a predetermined period; and second control means connected in series with the output of said rectifier and responsive to the flow of current consistent with a short circuit across the output of said rectifier for opening said switch means at the end of a predetermined time delay period of insufficient duration to allow damage to said rectifier.

11. Apparatus for supplying direct current for intermittent welding operations of short duration and requiring current of high value, said apparatus being operative from an alternating current power source and comprising, in combination, a rectifier; a transformer connected to said alternating current power source for supplying power to said rectifier; first switch means for interrupting the flow of current from said power source to said transformer; and control means powered from said alternating current power source for preventing damage to said rectifier as a result of an overload on said rectifier, said control means comprising said first switch means, first time delay means for opening said first switch means at the end of a first predetermined period, second switch means for controlling the flow of current from said alternating current power source to said first time delay means, second time delay means for opening said first switch means at the end of a second predetermined period, third switch means for controlling the flow of current from said alternating current source to said second time delay means, first relay means responsive to a predetermined drop in the potential difference across the output of said rectifier consistent with a predetermined overload on said rectifier for closing said second switch means, and second relay means responsive to the flow of current of a value consistent with a short circuit across the output of said rectifier for closing said third switch means.

12. The welding current supply apparatus of claim 11 wherein said predetermined overload on said rectifier for operating said first relay means to close said second switch means substantially exceeds the 100% duty cycle load capacity of said rectifier, and said predetermined period of delay for said second time delay means is of a duration insufficient to permit damage to said rectifier as a result of a short circuit across the output of said rectifier.

13. The welding current supply apparatus of claim 11 wherein said second switch means is normally closed, said first relay means is operative when energized, to hold said second switch means open, and said first relay means is so constructed as to allow said second switch means to close when the potential difference across the output of said rectifier falls below a predetermined value.

14. The welding current supply apparatus of claim 11 wherein said control means include third relay means operated by alternating current from said power source for opening said first switch means when said third relay means is energized; and said first and second time delay means include switch means for controlling the flow of current from said power source to said third relay means.

15. The welding current supply apparatus of claim 14 wherein said control means include fourth switch means for controlling the flow of current from said power source to said third relay means, said fourth switch means comprising a temperature-sensitive switch mounted within said transformer for automatically closing when said transformer reaches an unsafe temperature.

16. Apparatus for supplying direct current for intermittent welding operations of short duration and requiring current of high value, said apparatus being operative from an alternating current power source and comprising, in combination, a rectifier; a transformer connected to said alternating current power source for supplying power to said rectifier; first switch means for interrupting the flow of current from said power source to said transformer; and control means powered from said alternating current power source for preventing damage to said rectifier as a result of an overload on said rectifier, said control means comprising said first switch means, first time delay means for opening said first switch means at the end of a first predetermined period, second switch means for controlling the flow of current from said alternating current power source to said first time delay means, second time delay means for opening said first switch means at the end of a second predetermined period, third switch means for controlling the flow of current from said alternating current source to said second time delay means, first relay means connected across the output of said rectifier and being responsive to a drop in the potential difference across said output consistent with a load of predetermined value on said rectifier for closing said second switch means, and second relay means connected in series with the output of said rectifier and responsive to the flow of current from said rectifier consistent with a short circuit across the output of said rectifier for closing said third switch means.

17. The welding current supply apparatus of claim 16 wherein said control means comprise a third relay means operative by current from said alternating current power source for opening said first switch means, and said first and second time delay means include switch means for controlling the flow of current from said source to said third relay means.

18. The welding current supply apparatus of claim 16 wherein said second switch means is normally closed and said first relay means is operative, when energized, to hold said second switch means open, and said first relay means is so constructed as to allow said second switch means to close when the potential difference across the output of said rectifier falls below a predetermined value.

19. Apparatus for supplying direct current for intermittent welding operations of short duration and requiring current of high value, said apparatus being operative from an alternating current power source and comprising, in combination, a rectifier of the bridge type comprising semi-conductor elements capable of overload operation for brief periods without suffering damage and operation under short-circuit conditions for shorter periods without suffering damage; a transformer connected to said alternating current power source for supplying power to said rectifier; and control means powered from said alternating current source for preventing damage to said rectifier as a result of an overload on said rectifier, said control means comprising first switch means for interrupting the flow of current from said power source to said transformer, first time delay means for opening said first switch means at the end of a first predetermined period, second switch means for controlling the flow of current from said alternating current source to said first time delay means, second time delay means for opening said first switch means at the end of a second predetermined period which is substantially shorter than said first predetermined period, third switch means for controlling the flow of current from said alternating current source to said second time delay means, first relay means responsive to a drop in the potential difference across the output of said rectifier consistent with a load on said rectifier exceeding, by a predetermined amount, the 100% duty cycle current load capacity of said rectifier for closing said second switch means, and second relay means responsive to the flow of current from said rectifier consistent with a short circuit across the output of said rectifier for closing said third switch means.

20. The welding current supply apparatus of claim 19, wherein said control means include third relay means operated by alternating current from said power source for opening said first switch means when said third relay means is energized; and said first and second time delay means include switch means for controlling the flow of current from said power source to said third relay means.

21. The welding current supply apparatus of claim 20 wherein said control means include fourth switch means for controlling the flow of current from said power source to said third relay means, said fourth switch means comprising a temperature-sensitive switch mounted within said transformer for automatically closing when said transformer reaches an unsafe temperature.

References Cited in the file of this patent
UNITED STATES PATENTS

| | | |
|---|---|---|
| 2,132,839 | Widmer et al. | Oct. 11, 1938 |
| 2,265,591 | Winograd | Dec. 9, 1941 |
| 2,331,643 | Winograd | Oct. 12, 1943 |
| 2,397,089 | Cox et al. | Mar. 26, 1946 |